United States Patent
Allgeier et al.

(10) Patent No.: US 11,723,326 B2
(45) Date of Patent: Aug. 15, 2023

(54) POD MOUNTING INTERFACE FOR AN INDOOR GARDEN CENTER

(71) Applicant: Haier US Appliance Solutions, Inc., Wilmington, DE (US)

(72) Inventors: Brian Allgeier, Louisville, KY (US); Louis A. Wantland, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 77 days.

(21) Appl. No.: 17/464,795

(22) Filed: Sep. 2, 2021

(65) Prior Publication Data

US 2023/0065573 A1 Mar. 2, 2023

(51) Int. Cl.
*A01G 31/04* (2006.01)
*A01G 31/00* (2018.01)

(52) U.S. Cl.
CPC ........ *A01G 31/04* (2013.01); *A01G 2031/006* (2013.01)

(58) Field of Classification Search
CPC . A01K 31/04; A01K 9/00; A01K 9/02; A01K 9/021; A01K 9/022; A01G 31/04; A01G 9/00; A01G 9/02; A01G 9/021; A01G 9/022

See application file for complete search history.

(56) References Cited

U.S. PATENT DOCUMENTS

| | | | |
|---|---|---|---|
| 8,984,806 B2 | 3/2015 | Uchiyama | |
| 9,338,948 B2 * | 5/2016 | DeYoung | A01G 9/045 |
| 9,612,010 B1 * | 4/2017 | Kimmel | F21V 37/002 |
| 9,668,428 B1 * | 6/2017 | Frame | A01G 9/028 |
| 9,974,243 B2 | 5/2018 | Martin | |
| 10,798,881 B2 * | 10/2020 | Whitcomb | B29C 49/4823 |
| 11,089,739 B2 * | 8/2021 | Whitcomb | A01G 9/021 |
| 2008/0078118 A1 * | 4/2008 | Bissonnette | A01G 9/0293 47/65.5 |
| 2012/0167460 A1 | 7/2012 | Omidi | |
| 2014/0069006 A1 * | 3/2014 | Nicolay | A01G 9/02 47/65.5 |
| 2015/0068121 A1 | 3/2015 | O'Connor | |
| 2015/0313095 A1 * | 11/2015 | Fenner, Jr. | A01G 7/045 47/84 |
| 2017/0066587 A1 * | 3/2017 | Fenner, Jr. | A01G 9/249 |
| 2018/0125013 A1 * | 5/2018 | Holby | A01G 9/02 |

(Continued)

FOREIGN PATENT DOCUMENTS

| | | |
|---|---|---|
| CN | 102499051 B | 12/2013 |
| CN | 210298916 U | 4/2020 |

(Continued)

*Primary Examiner* — Monica L Perry
*Assistant Examiner* — Aaron M Rodziwicz
(74) *Attorney, Agent, or Firm* — Dority & Manning, P.A.

(57) ABSTRACT

An indoor gardening appliance includes a liner defining a grow chamber and a grow module rotatably mounted within the grow chamber for receiving a plurality of plant pods. A grow module is provided for receiving pods within apertures of the grow module, which includes locking tabs configured for slidably engaging with slots, which are defined in each pod. The grow module and the pods have complementary tapered interfaces that form a seal when the locking tabs are slidably engaged with the slots.

20 Claims, 13 Drawing Sheets

(56) References Cited

U.S. PATENT DOCUMENTS

| | | | |
|---|---|---|---|
| 2018/0295800 A1 | 10/2018 | Kiernan | |
| 2020/0352360 A1 | 11/2020 | Hunter | |
| 2021/0084834 A1* | 3/2021 | Hunter | A01G 13/02 |
| 2021/0084836 A1* | 3/2021 | Hunter | A01G 9/16 |
| 2021/0224979 A1* | 7/2021 | Hunter | A01G 7/045 |
| 2022/0174898 A1* | 6/2022 | Allgeier | A01G 9/023 |
| 2022/0408671 A1* | 12/2022 | Vijayan | A01G 31/06 |

FOREIGN PATENT DOCUMENTS

| | | | | |
|---|---|---|---|---|
| GB | 2416978 A * | 2/2006 | | A01G 9/021 |
| JP | 2012110285 A | 6/2012 | | |
| JP | 5808992 B2 | 11/2015 | | |
| KR | 101557553 B1 | 10/2015 | | |
| KR | 101878092 B1 | 7/2018 | | |
| KR | 101881953 B1 | 7/2018 | | |
| WO | WO2018158093 A1 | 9/2018 | | |
| WO | WO2020076729 A1 | 4/2020 | | |
| WO | WO-2020142851 A1 * | 7/2020 | | A01G 31/02 |

* cited by examiner

POD MOUNTING INTERFACE FOR AN INDOOR GARDEN CENTER

FIELD OF THE INVENTION

The present subject matter relates generally to systems for gardening plants indoors, and more particularly, to interfaces for mounting a pod in an indoor gardening appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Certain indoor gardening appliances include a grow tower that includes features for supporting a plurality of plants. For example, conventional grow towers include openings for receiving plant pods that contains seeds or other plant material. The plant pods are passed at least partially through the opening and into a root chamber where the plant roots may be supplied with the hydration and nutrients necessary for growth. However, the grow towers typically rely on gravity to hold the plant pods in place, resulting in insufficient pod stability, particularly when the grow tower is not stationary or has angled support surfaces. Moreover, conventional grow towers do not generate a suitable seal between the plant pod and the grow tower, resulting in leakage from the root chamber and difficulty in climate control.

Accordingly, an improved indoor garden center would be useful. More particularly, an indoor garden center with improved grow modules that address one or more of the issues described above would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance is provided including a liner positioned within a cabinet and defining a grow chamber, a grow module mounted within the liner, the grow module defining an aperture generally defining an axial direction, a radial direction, and a circumferential direction, wherein a first tapered interface surrounds the aperture and defines a locking tab that extends inward along the radial direction, and a plant pod configured to slidably engage the aperture of the grow module, the plant pod defining a second tapered interface that is complementary to the first tapered interface and a slot that is defined within the second tapered interface for engaging the locking tab as the plant pod is rotated to an installed position.

In another exemplary embodiment, a grow module for a gardening appliance is provided, the grow module defining an aperture generally defining an axial direction, a radial direction, and a circumferential direction, wherein a first tapered interface surrounds the aperture and defines a locking tab that extends inward along the radial direction, wherein the aperture is configured to receive a plant pod that defines a second tapered interface complementary to the first tapered interface and a slot for receiving the locking tab to secure the plant pod and create a seal between the first tapered interface and the second tapered interface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
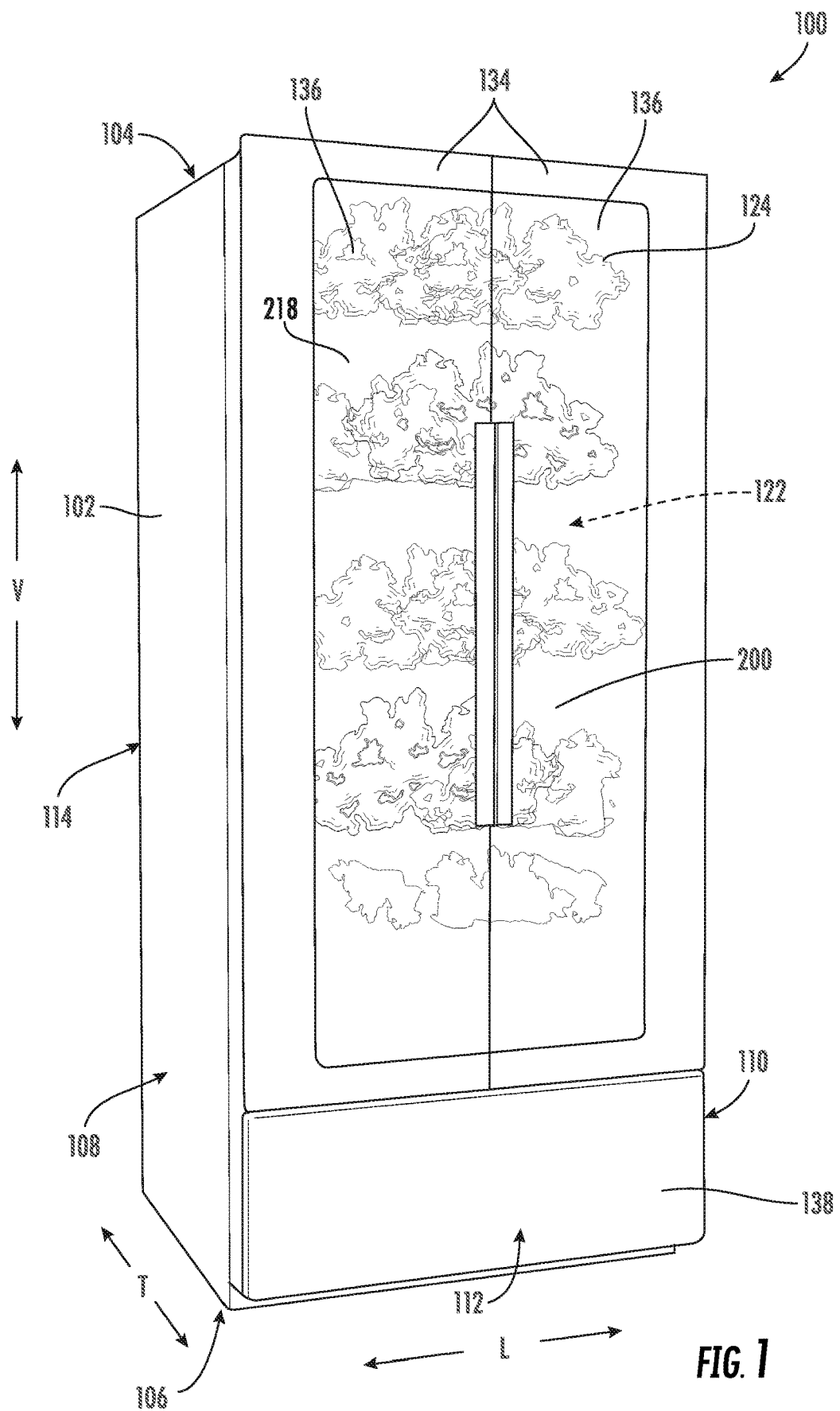
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled chamber, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Figure 2:
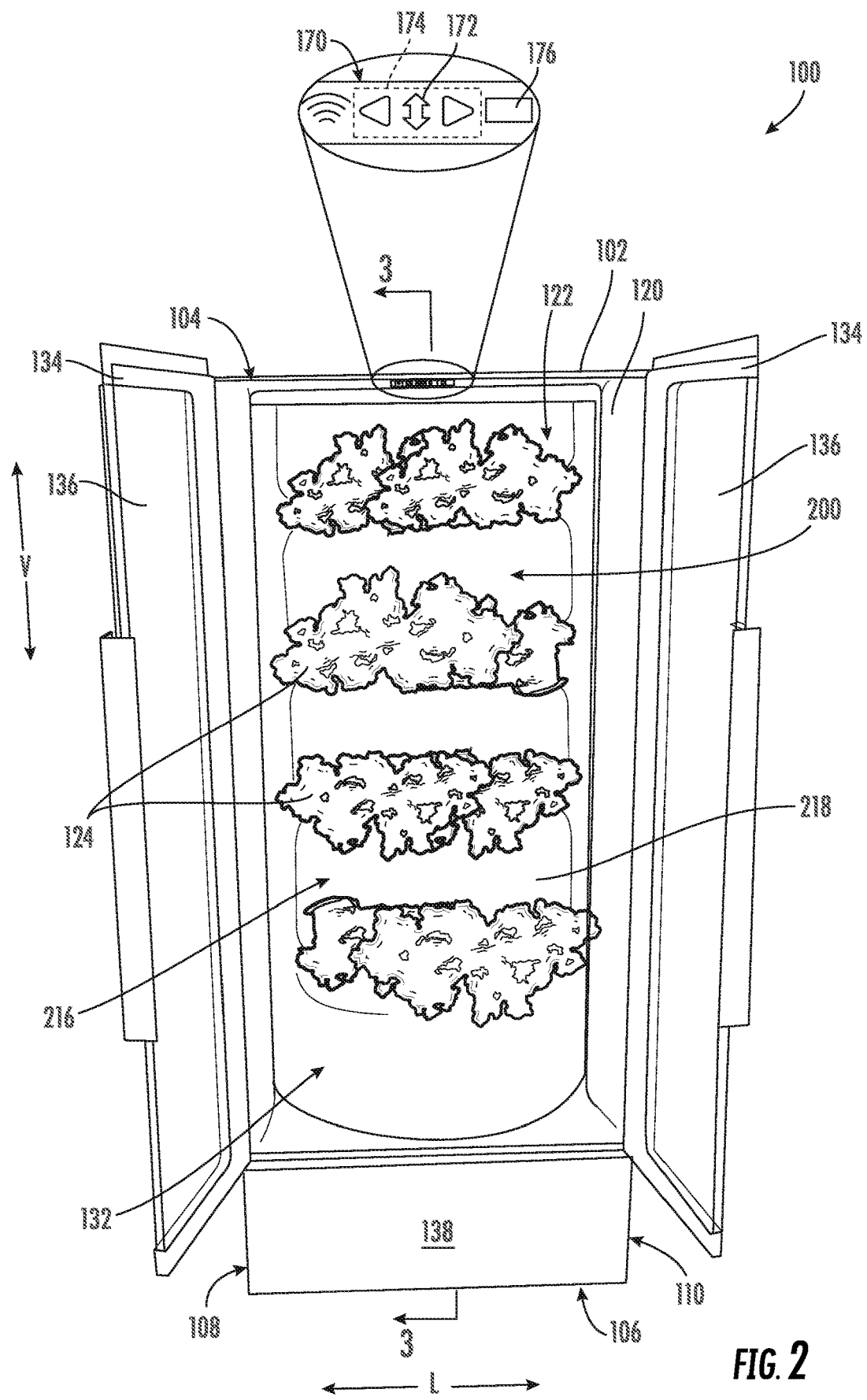
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
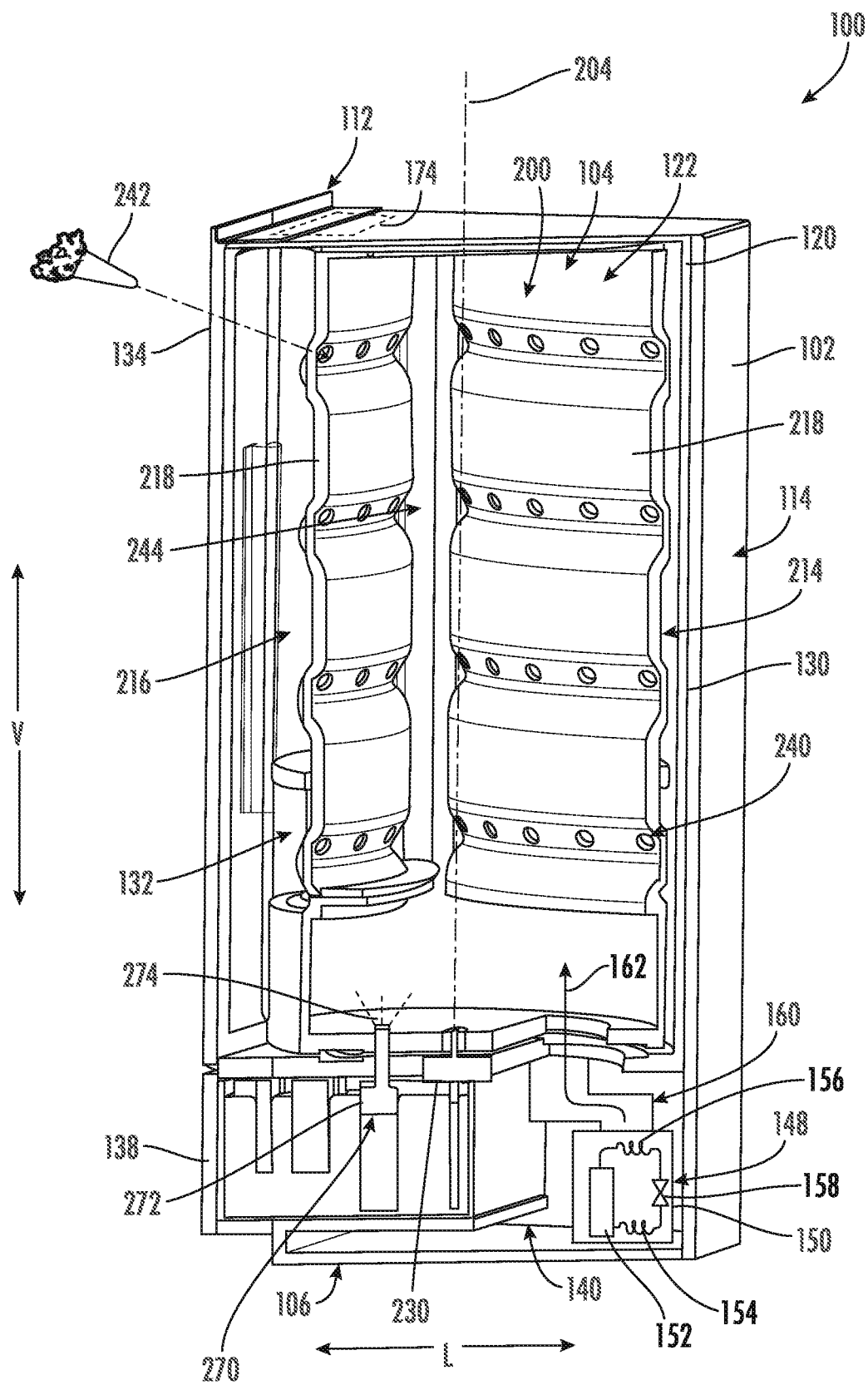
FIG. 3 is a cross sectional view of the exemplary gardening appliance of FIG. 1, taken along Line 3-3 from FIG. 2 with an internal divider removed for clarity.

FIG. 3 provides a schematic view of certain components of an environmental control system 148 that may be used to regulate a temperature within grow chamber 122. Specifically, environmental control system 148 may include a sealed system 150, a duct system 160, and a hydration system 270, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high-quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156. These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g., in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g., via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 4:
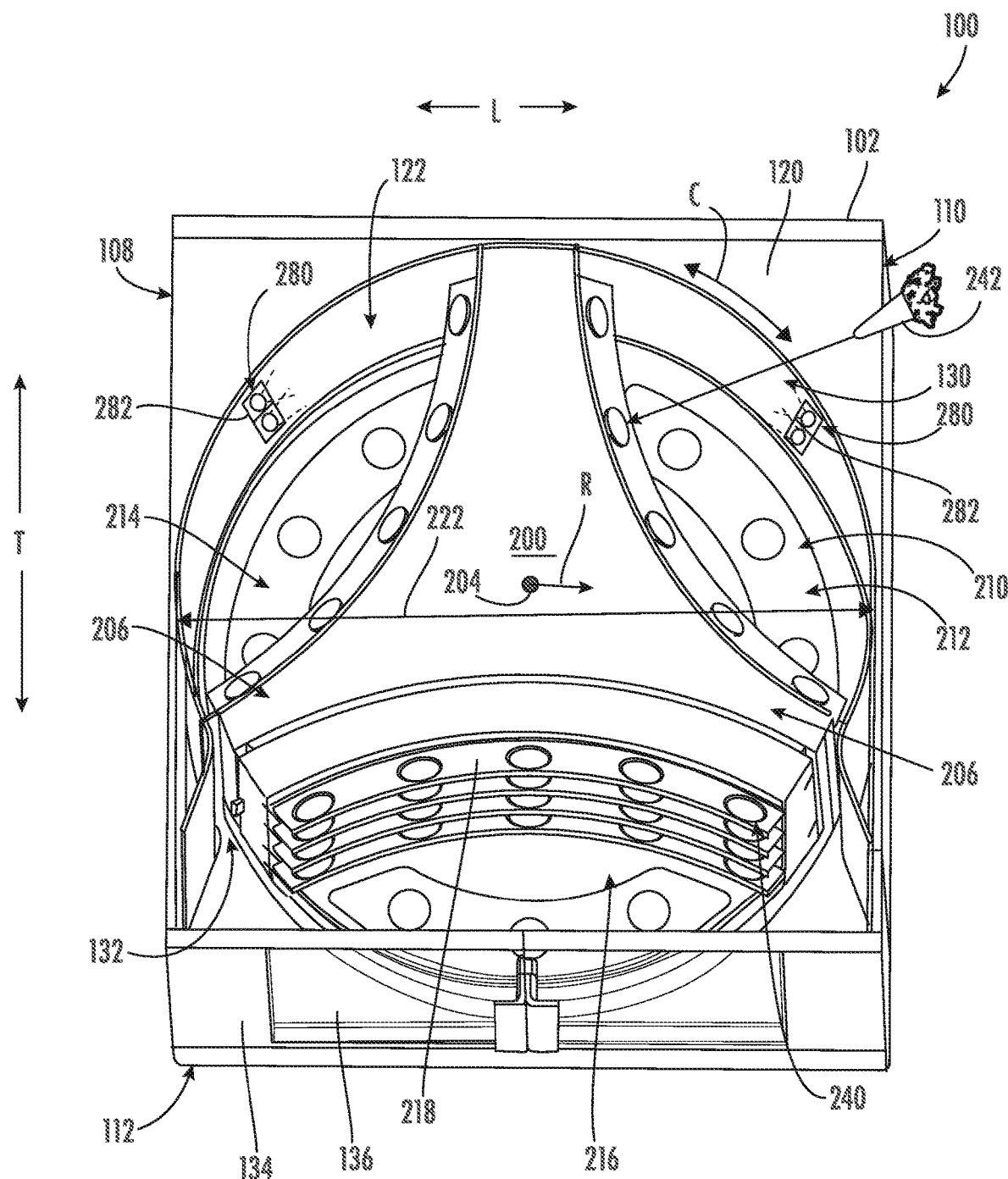
FIG. 4 is a top perspective view of the exemplary gardening appliance of FIG. 1, with the top panel of the cabinet removed to reveal a rotatable grow module according to an exemplary embodiment of the present subject matter.
Figure 5:
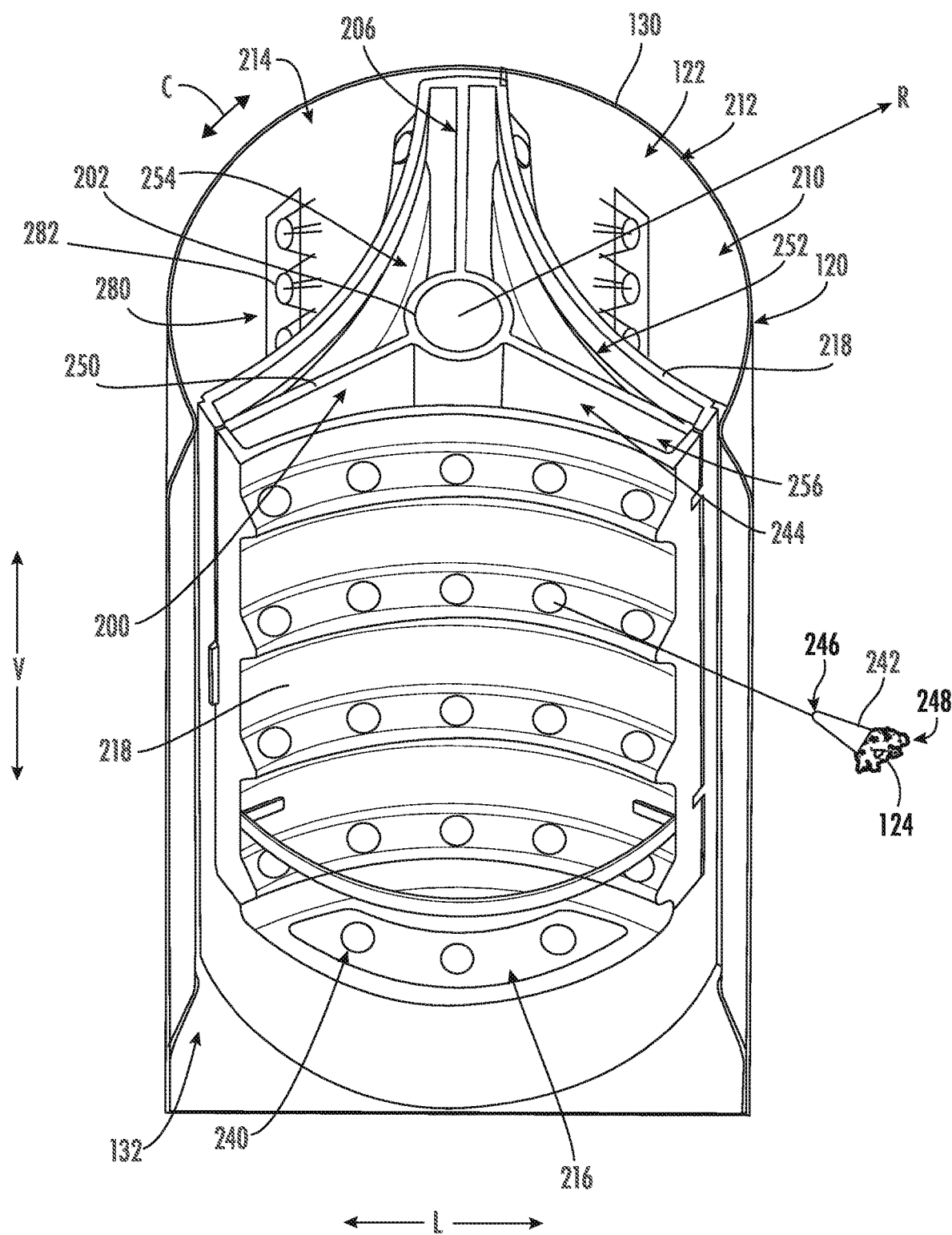
FIG. 5 provides a perspective cross sectional view of the exemplary gardening appliance of FIG. 1 according to another exemplary embodiment of the present subject matter.
Figure 6:
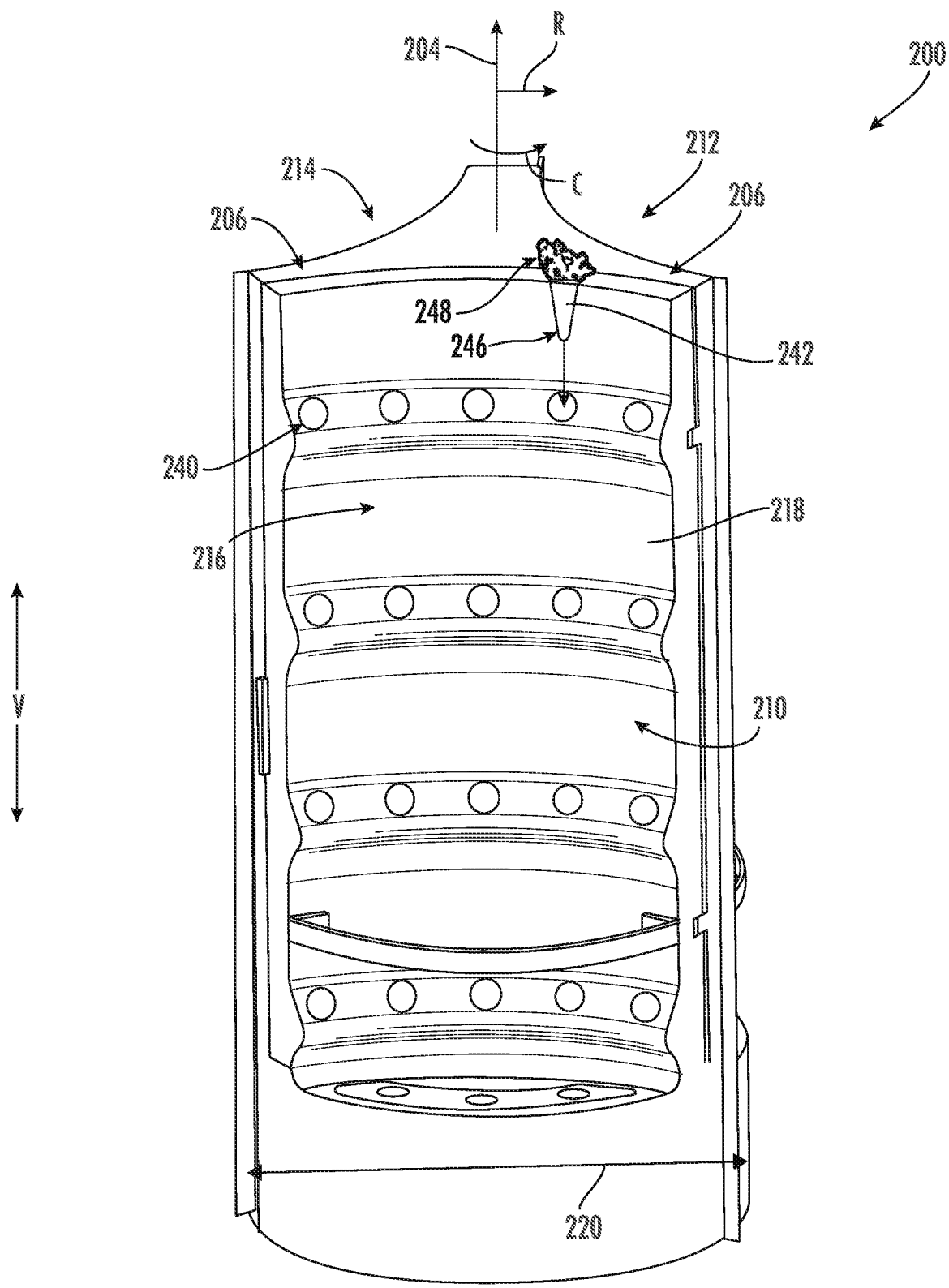
FIG. 6 provides a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into root chamber 244. A plant end 248 of the plant pod 242 may remain within grow chamber 210 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, apertures 240 may be covered by a flat flapper seal (not shown) to prevent water from escaping root chamber 244 when no plant pod 242 is installed.

Figure 7:
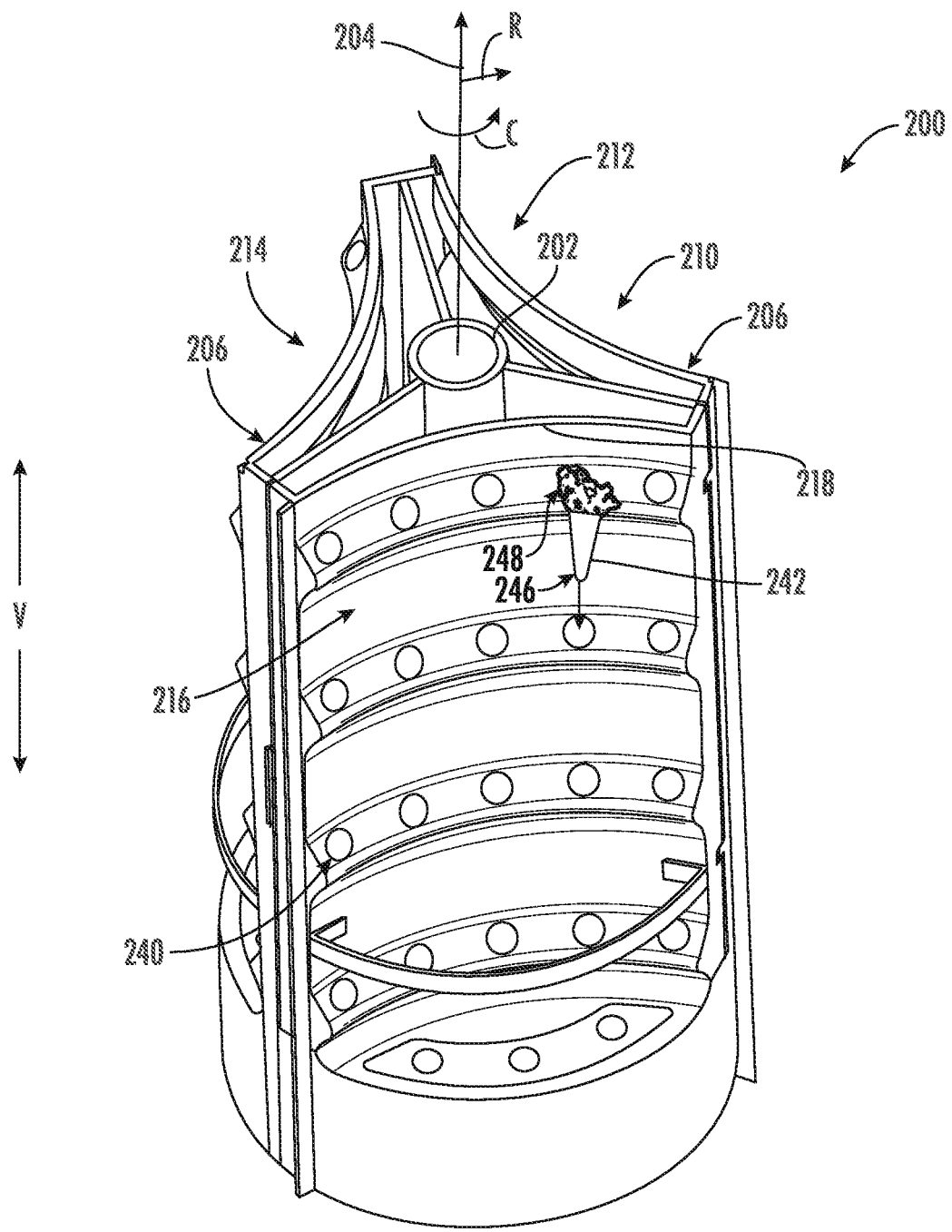
FIG. 7 provides a perspective cross sectional view of the exemplary grow module of FIG. 6 according to another exemplary embodiment of the present subject matter.
Figure 8:
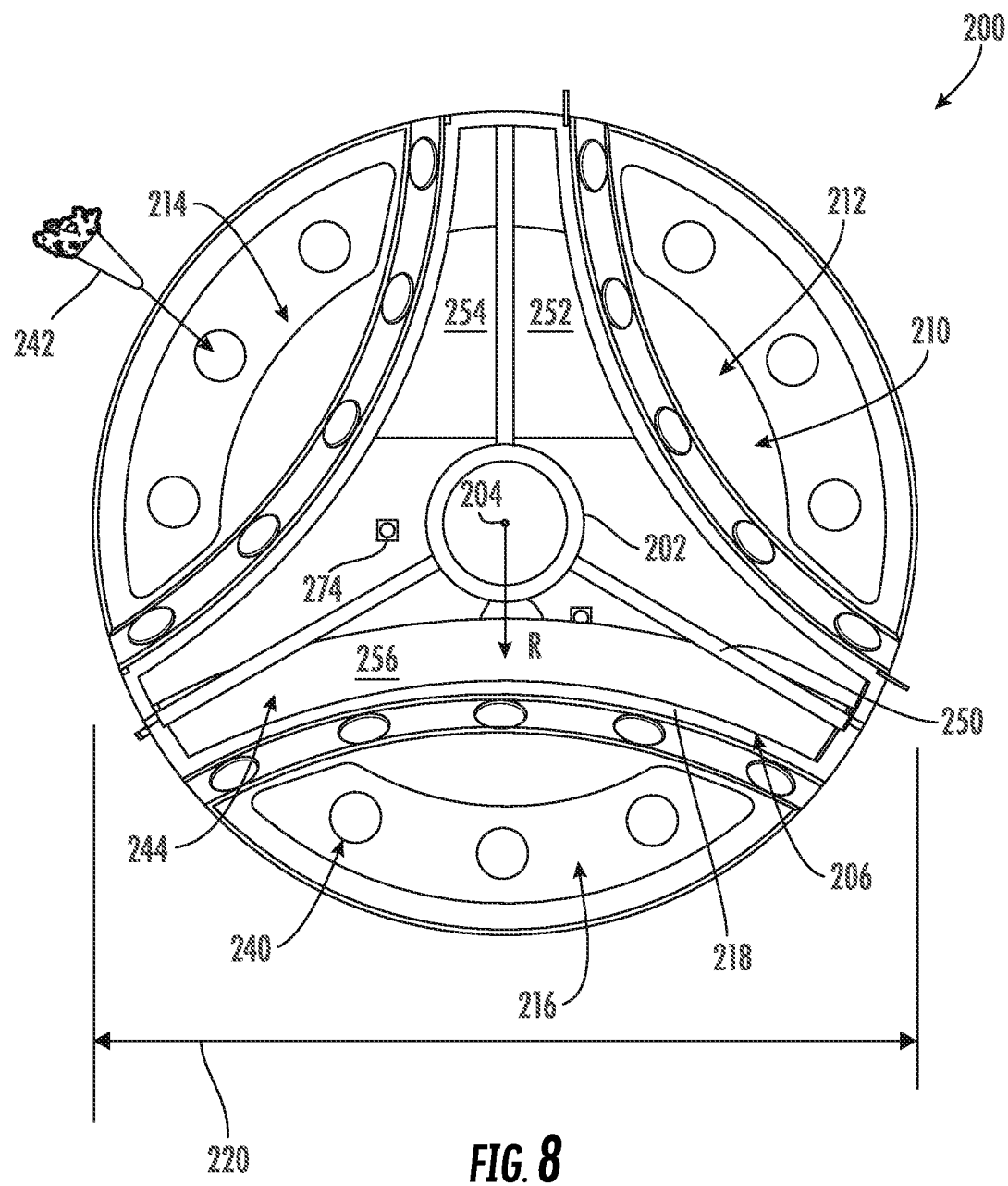
FIG. 8 provides a top cross-sectional view of the exemplary grow module of FIG. 6 according to another exemplary embodiment of the present subject matter.
Figure 9:
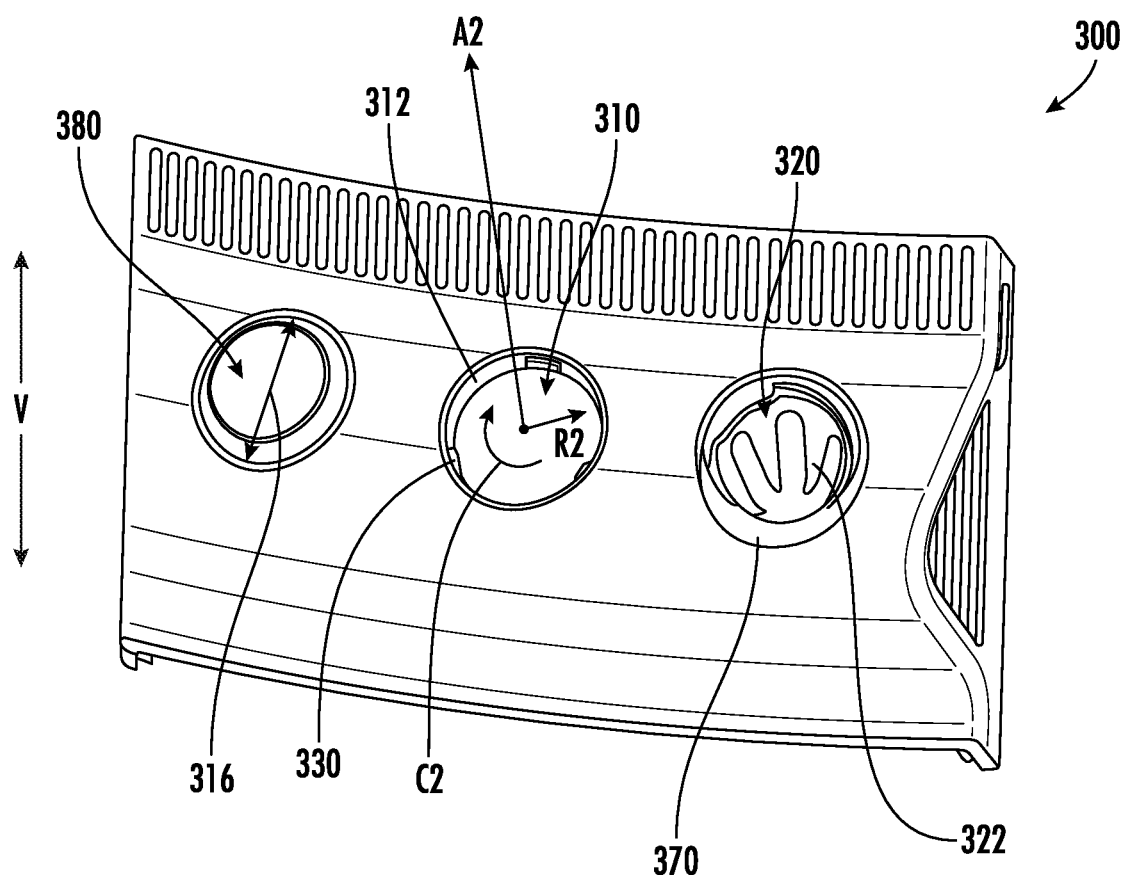
FIG. 9 provides a perspective view of a grow module that may be used with the exemplary gardening appliance of FIG. 1 according to an exemplary embodiment of the present subject matter.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality of root chambers 252-256 independently of each other.

Environmental control system 148 may further include a hydration system 270 which is generally configured for providing water to plants 124 to support their growth. Specifically, according to the illustrated embodiment, hydration system 270 generally includes a water supply 272 and misting device 274 (e.g., such as a fine mist spray nozzle or nozzles). For example, water supply 272 may be a reservoir containing water (e.g., distilled water) or may be a direct connection municipal water supply. According to exemplary embodiments, hydration system 270 may include one or more pumps (not shown) for providing a flow of liquid nutrients to misting device 274. In this regard, for example, water or nutrients that are not absorbed by roots of plants 124 may fall under the force of gravity into a sump and the pump may be fluidly coupled to sump to recirculate the water through misting device 274.

Misting device 274 may be positioned at a bottom of root chamber 244 and may be configured for charging root chamber 244 with mist for hydrating the roots of plants 124. Alternatively, misting devices 274 may pass through central hub 204 along the vertical direction V and periodically include a nozzle for spraying a mist or water into root chamber 244. Because various plants 124 may require different amounts of water for desired growth, hydration system 270 may alternatively include a plurality of misting devices 274, e.g., all coupled to water supply 272, but being selectively operated to charge each of first root chamber 252, second root chamber 254, and third root chamber 256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

Referring now for example to FIGS. 4 and 5, gardening appliance 100 may further include a light assembly 280 which is generally configured for providing light into selected grow chambers 210 to facilitate photosynthesis and growth of plants 124. As shown, light assembly 280 may include a plurality of light sources 282 stacked in an array, e.g., extending along the vertical direction V. For example, light sources 282 may be mounted directly to liner 120 within grow chamber 122, or may alternatively be positioned behind liner 120 such that light is projected through a transparent window or light pipe into grow chamber 122. The position, configuration, and type of light sources 282 described herein are not intended to limit the scope of the present subject matter in any manner.

Light sources 282 may be provided as any suitable number, type, position, and configuration of electrical light source(s), using any suitable light technology and illuminating in any suitable color. For example, according to the illustrated embodiment, light source 282 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 282 may include any other suitable traditional light bulbs or sources, such as halogen bulbs, fluorescent bulbs, incandescent bulbs, glow bars, a fiber light source, etc.

As explained above, light generated from light assembly 280 may result in light pollution within a room where gardening appliance 100 is located. Therefore, aspects of the present subject matter are directed to features for reducing light pollution, or to the blocking of light from light sources 282 through front display opening 132. Specifically, as illustrated, light assembly 280 is positioned only within the enclosed back portion 130 of liner 120 such that only grow chambers 210 which are in a sealed position are exposed to light from light sources 282. Specifically, grow module 200 acts as a physical partition between light assemblies 280 and front display opening 132. In this manner, as illustrated in FIG. 5, no light may pass from first chamber 212 or second chamber 214 through grow module 200 and out front display opening 132. As grow module 200 rotates, two of the three grow chambers 210 will receive light from light assembly 280 at a time. According to still other embodiments, a single light assembly may be used to reduce costs, whereby only a single grow chamber 210 will be lit at a single time.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 206, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow module 200 but may have a modified cabinet 102 such that front display opening 132 is wider and two of the three grow chambers 210 are displayed at a single time. Thus, first chamber 212 may be in the sealed position, while second chamber 214 and third chamber 216 may be in the display positions. As grow module 200 is rotated counterclockwise, first chamber 212 is moved into the display position and third chamber 216 is moved into the sealed position.

Referring now to FIGS. 9 through 13, a grow module 300 will be described accordingly to an exemplary embodiment of the present subject matter. Specifically, grow module 300 may generally be positioned within the gardening appliance 100 and may be a portion of (or may replace) grow module 200. As explained herein, grow module 300 is generally configured for receiving one or more plant pods 320 or seal caps 380. Although an exemplary embodiment of grow module 300 is described below as being used to engage pods 320 and seal caps 380 within gardening appliance 100, it should be appreciated that variations and modifications may be made to grow module 300 while remaining within the scope of the present subject matter. In addition, it should be appreciated that grow module 300 is not limited to the application described herein. Indeed, grow module 300 may be used to engage any structure with any grow module within any gardening appliance.

Figure 10:
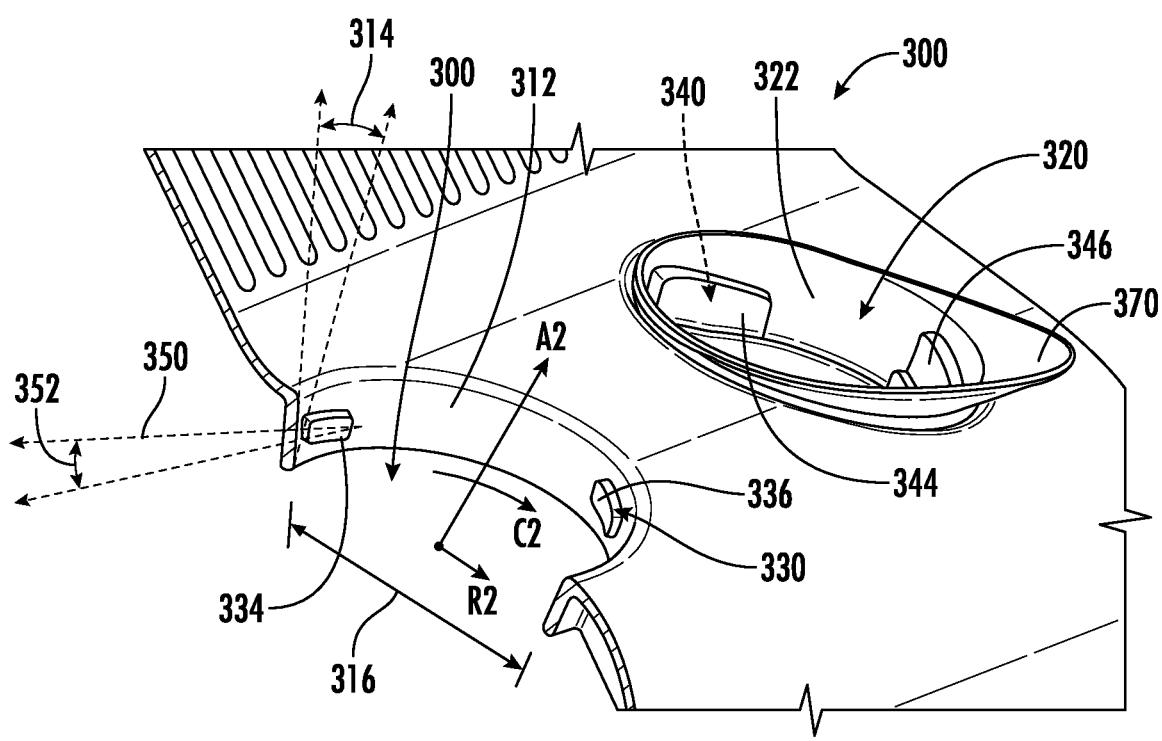
FIG. 10 provides a cross sectional view of the exemplary grow module of FIG. 9 according to an exemplary embodiment of the present subject matter.

As illustrated, grow module 300 may generally define a plurality of apertures 310, which may provide fluid communication between the root chamber 244 and the grow chamber 210 (e.g., the region within liner 120 and outside root chamber 244). The plurality of apertures 310 may be the same or similar to the plurality of apertures 240 above. Indeed, like reference numerals may be used to refer to same or similar features between grow module 240 and grow module 300. As best shown in FIG. 10, aperture 310 of grow module 200 may generally define an axial direction A2, e.g., a direction that extends through a center of aperture 310 and is concentric with both an entry and an exit (not labeled) of aperture 310. Similarly, aperture 310 may radial direction R2 (e.g., perpendicular to axial direction A2) and a circumferential direction C2 (e.g., about axial direction A2 within a radial plane).

Referring still to FIG. 10, each aperture 310 may be defined by a first tapered interface 312 of the grow module 300 such that first tapered interface 312 surrounds and defines aperture 310. Specifically, first tapered interface 312 may be tapered such that a taper angle 314 is defined between first tapered interface 312 and axial direction A2 (see, e.g., FIGS. 10 and 13). According to exemplary embodiments, taper angle 314 may be between about 0 degrees and 60 degrees, between about 10 degrees and 50 degrees, between about 20 degrees and 40 degrees, or about 30 degrees.

Accordingly, first tapered interface 312 may be tapered toward the root chamber 244 such that aperture 310 is narrower closer to the root chamber 244 and broader closer to the grow chamber 210. That is, aperture 310 may define a diameter 316 that decreases toward root chamber 244. According to the illustrated embodiment, first tapered interface 312 is tapered in a linear or constant manner. However, it should be appreciated that according to alternative embodiments, first tapered interface 312 may have any other suitable profile.

Figure 12:
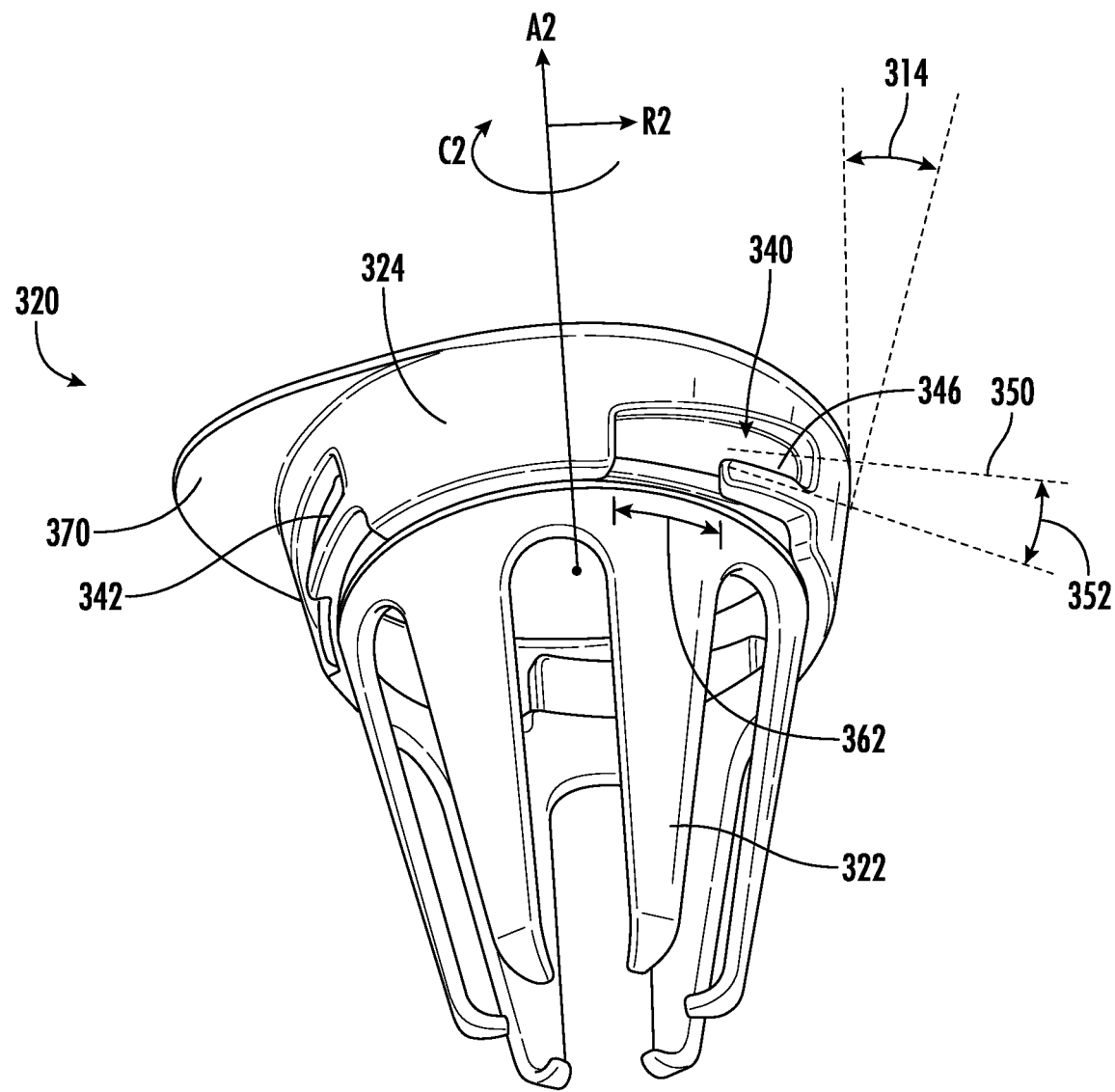
FIG. 12 provides a perspective view of a plant pod of the exemplary grow module of FIG. 9 according to an exemplary embodiment of the present subject matter.

Grow module 300 may also include or be configured to receive one or more plant pods 320 that are configured to slidably engage with the apertures 310 of grow module 300. As best shown in FIG. 12, plant pods 320 (when installed) may generally define an axial, radial, and circumferential coordinate system corresponding to that described above for apertures 310. Accordingly, the axial direction A2, radial direction R2, and circumferential direction C2 may be used to refer to features of plant pods 320.

In some embodiments, as depicted in FIG. 12, plant pods 320 may define various features for supporting plants 124 while ensuring desired engagement within aperture 310 of grow module 300. For example, plant pods 320 may include a plurality of prongs 322 or other support structures that may be generally intended to support a root ball of plants 124 during growth. However, it should be appreciated that plant pod 320 need not comprise prongs 322. For example, plant pod 320 may comprise a solid or mesh portion in place of prongs 322, or plant pod 320 may not comprise an alternative to prongs 322 at all.

Referring still to FIG. 12, plant pod 320 may define a second tapered interface 324, e.g., defining an outer mating surface for engaging first tapered interface 312 as plant pod 320 is moved toward the installed position (see, e.g., FIG. 10). For example, the second tapered interface 324 of plant pod 320 may be complementary to the first tapered interface 312 of the grow module 300. As used herein, the phrase "complementary to" means having dimensions such that correspond to, are similar to, or are otherwise related to another structure. For example, when plant pod 320 is slidably engaged within aperture 310 of grow module 300, first tapered interface 312 of grow module 300 engages with second tapered interface 324 of plant pod 320 to form a seal. For example, in one exemplary embodiment, first tapered interface 312 may have a certain slope or profile, and second tapered interface 324 may have a corresponding, opposite slope or profile, such that the slopes or profiles of tapered interfaces 312 and 324 are able to fit together to form a seal.

For example, second tapered interface 324 may be tapered such that a taper angle is defined between second first tapered interface 324 and axial direction A2 when plant pod 320 is in the installed position. Due to the similarity between first tapered interface 312 and second tapered interface 324, taper angle 314 may be used to describe the profile of both surfaces (see, e.g., FIG. 13). Accordingly, according to exemplary embodiments, taper angle 314 of second tapered interface 324 may be opposite first tapered interface 312 and have a magnitude between about 0 degrees and 60 degrees, between about 10 degrees and 50 degrees, between about 20 degrees and 40 degrees, or about 30 degrees.

Notably, having a tapered engagement between first tapered interface 312 and second tapered interface 324 may ensure that the seal formed between plant pod 320 and grow module 300 may be improved as the plant pod 320 is urged into contact with grow module 300. This engagement may be desirable both for ensuring that plant pods 320 are secured within apertures 310 and ensuring that root chamber 244 is isolated from the remainder of grow chamber 210. In this manner climate control within these chambers may be separately regulated. In addition, securing plant pods 320 may be desirable to prevent accidental removal of plant pods 320, particularly when grow module 300 rotates or moves within cabinet 102.

Accordingly, aspects of the present subject matter may be directed to features for ensuring solid and secure engagement between plant pods 320 (and seal caps 380, described below) within grow module 300 when plant pods 320 are installed within apertures 310. More specifically, as described in more detail below, grow module 300 and plant pod 320 may define additional features that ensure firm engagement between first tapered interface 312 and second tapered interface 324 when plant pod 320 is positioned in the installed position. Examples of such engagement features and structures are provided below according to exemplary embodiment, though variations and modifications may be made to such structures while remaining within the scope of the present subject matter.

According to the illustrated exemplary embodiment, first tapered interface 312 may define one or more locking tabs (identified generally by reference numeral 330). In some embodiments, first tapered interface 312 may have only one locking tab 330, while in other embodiments, first tapered interface 312 may have multiple locking tabs 330. For example, in the embodiment depicted in FIG. 9-11, first tapered interface 312 has three locking tabs 330. Specifically, as will be described in more detail herein, first tapered interface 312 of the illustrated embodiment defines a first locking tab 332, a second locking tab 334, and a third locking tab 336. As best shown in FIG. 10, locking tabs 330 generally extend inward along the radial direction R2 from first tapered interface 312. As explained below, locking tabs 330 are generally configured for engaging and securing plant pod 320.

As illustrated in FIG. 12, second tapered interface 324 of plant pod 320 may define one or more slots (identified generally by reference numeral 340). Slots 340 may generally be configured to receive locking tabs 330 of grow module 300 to secure plant pod 320 within aperture 310. In some embodiments, second tapered interface 324 may have only one slot 340, while in other embodiments, second tapered interface 324 may have multiple slots 340. For example, in the illustrated exemplary, second tapered interface 324 has three slots 340. Specifically, as will be described in more detail herein, second tapered interface 324 of the illustrated embodiment defines a first slot 342, a second slot 344, and a third slot 346. According to exemplary embodiments, when plant pod 320 is in the installed position, first locking tab 332 will be secured within first slot 342, second locking tab 334 will be secured within second slot 344, and third locking tab 336 will be secured within third slot 346.

Notably, in order to ensure firm engagement between first tapered interface 312 and second tapered interface 324, each of tabs 330 and slots 340 may be helical. As used herein, the term "helical" means forming a spiral pattern about the axial direction A2 or being angled relative to the circumferential direction C2. For example, each of the locking tabs 330 (and slots 340) may generally define an extension axis 350 (see, e.g., FIGS. 10 and 13), and each locking tab 330 (and slots 340) may be positioned or angled such that the axis 350 forms a helical angle 352 with respect to the circumferential direction C2. In this manner, plant pod 320 is urged further into aperture 310 as it is rotated relative to grow module 300. It should be appreciated, however, that locking tabs 330 (and slots 340) may be any other type of locking tabs other than helical locking tabs. For example, locking tabs 330 (and slots 340) may be positioned such that axes 350 are aligned parallel to the circumferential direction C2 or such that locking tabs 330 (and slots 340) have any other suitable profile.

According to exemplary embodiments, helical angle 352 may be any angle with respect to the circumferential direction C2, such as between about 0 and 45 degrees, between about 5 and 40 degrees, between about 20 and 40 degrees, or between about 15 and 35 degrees. In still other embodiments, tabs 330 and slots 340 may be formed such that helical angle 352 forms an angle of 0 degrees with respect to the circumferential direction C2. Alternatively, tabs 330 and slots 340 may vary in angle and include plateaus, locking detents, or any other suitable profiles that facilitate secure engagement between plant pod 320 and grow module 300.

As illustrated in the drawings and described above, locking tabs 330 protrude from first tapered interface 312 of grow module 300 and slots 340 are defined within second tapered interface 324 of plant pods 320. However, it should be appreciated that the exemplary configuration of locking tabs 330 and slots 340, as described above, may be reversed such that locking tabs 330 are positioned about the circumferential direction C2 of second tapered interface 324 of plant pod 320 and slots 340 are positioned within first tapered interface 312 of the grow module 200.

Figure 11:
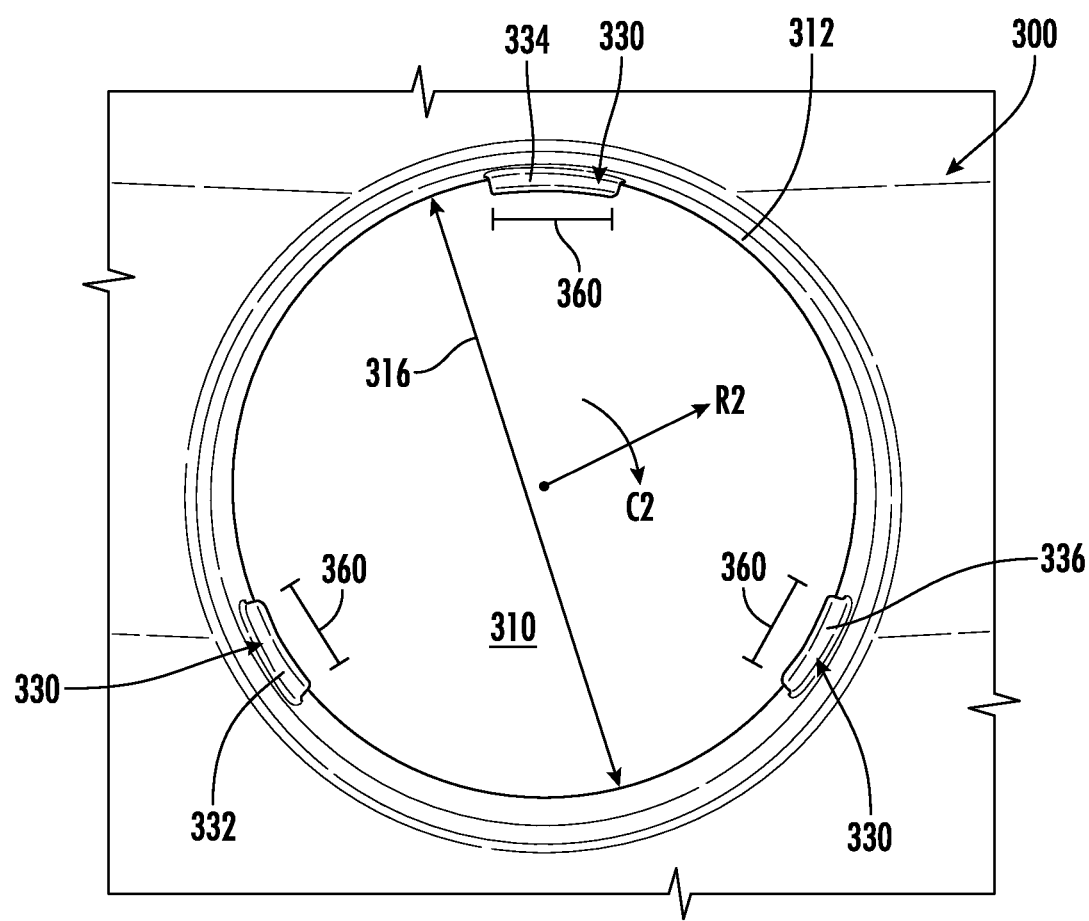
FIG. 11 provides a front view of an aperture of the exemplary grow module of FIG. 9 according to an exemplary embodiment of the present subject matter.

Referring now to FIG. 11, grow module 300 may define first locking tab 332, second locking tab 334, and third locking tab 336. In some embodiments, locking tabs 332, 334, and 336 may be evenly spaced about the first tapered interface 312 (e.g., separated by about 120 degrees about the circumferential direction C2 on first tapered interface 312). Additionally, each of the locking tabs 332, 334, and 336 may generally define a tab width 360. In generally, tab width 360 may be the length of tabs 330 as measured on the elongated dimension. For example, tab width 360 may be measured along the circumferential direction C2. Similarly, each of the slots 342, 344, and 346 may generally define a slot entry width 362. In general, slot entry width 362 may be the length of slots 340 as measured on the elongated dimension at the opening of slots 340, e.g., where tabs 330 would be inserted. For example, slot entry width 362 may be measured along the circumferential direction C2.

In general, tabs 330 and slots 340 may be sized to facilitate proper orientation and engagement between plant pods 320 and apertures 310 of grow module 300. In this regard, for example, the tab width 360 and/or slot width 362 of certain tabs 330 and slots 340 may enlarged relative to others. Specifically, for example, according to exemplary embodiments, tab width 360 of second locking tab 334 is greater than tab width 360 of first locking tab 332 and/or third locking tab 336 (which may be identical). In addition, slot entry width 362 of second slot 344 may be greater than slot entry width 362 of first slot 342 and/or third slots 346 (which may be identical).

Moreover, according to exemplary embodiments, tab width 360 of second locking tab 334 is greater than slot entry width 362 of first slot 342 (and/or third slot 346) and less than slot entry width 362 of second slot 344. Moreover, tab width 360 of first locking tab 332 and third locking tab 336 may be less than slot entry width 362 of first slot 342, second slot 344, and third slot 346. In this manner, first locking tab 332 and third locking tab 336 may be received within any slots 340. In addition, second locking tab 334 may be received into second slot 344 but not into first slot 342 and third slot 346. In this manner, plant pod 320 may be properly aligned or oriented before being inserted into aperture 310 and rotated to the installed position.

Additionally, still referring to FIG. 12, plant pod 320 may further include a handle 370 that extends from second tapered interface 324 and wraps along the circumferential direction C2. According to exemplary embodiments, handle 370 is defined 180 degrees from second locking tab 334 along the circumferential direction C2. In this manner, by positioning second locking tab 334 at a top of aperture 310 (e.g., at the 12 o'clock position), handle 370 will be positioned at the 6 o'clock position for easiest access to a user of gardening appliance 100. However, it should be appreciated that, in other embodiments, handle 370 may be positioned at any location along the circumferential direction C2. For example, handle 370 may function to indicate to a user the orientation needed to align locking tabs 330 and slots 340.

Figure 13:
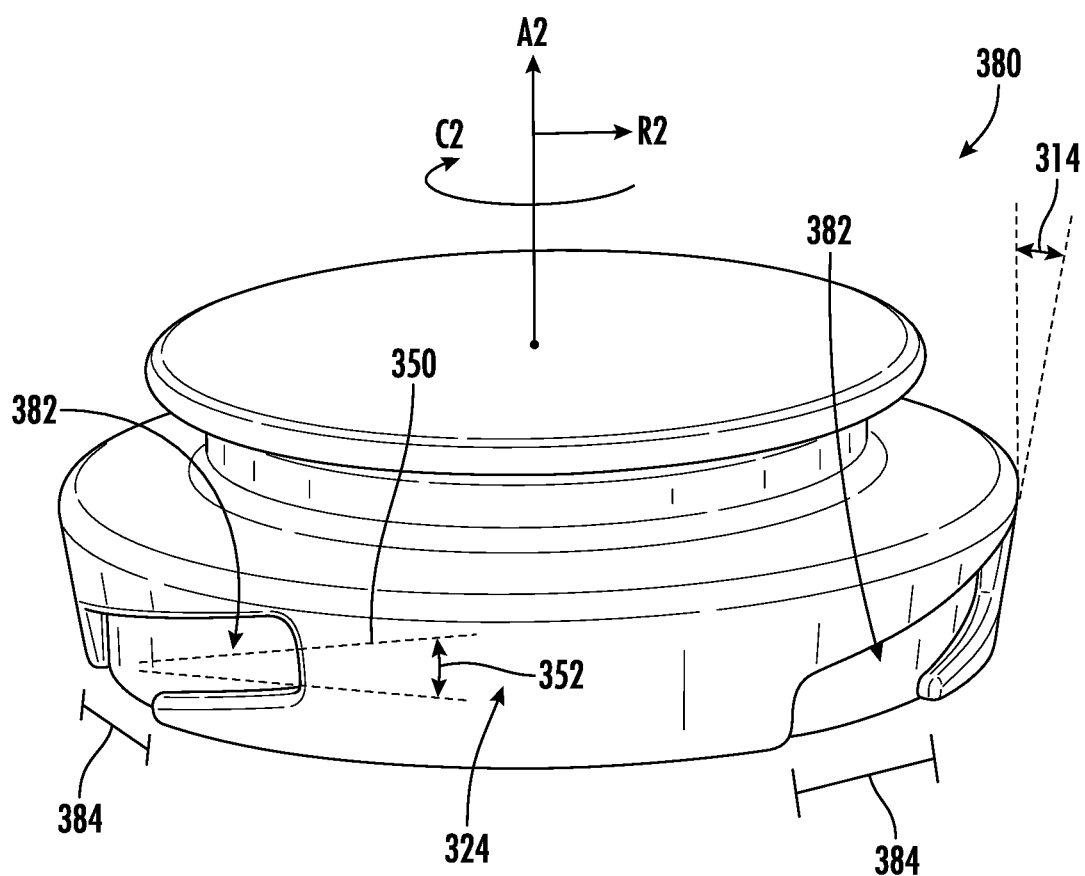
FIG. 13 provides a perspective view of a seal cap of the exemplary grow module of FIG. 9 according to another exemplary embodiment of the present subject matter.

Referring now to FIG. 13, grow module 300 may further include a seal cap 380. Due to similarities between seal cap 380 and plant pod 320, like reference numerals corresponding to plant pod 320 may be used to refer to same or similar features on seal cap 380 and detailed is omitted for brevity. In this exemplary embodiment, seal cap 380 may define one or more slots 382 (similar to slots 340) and each of which may define a slot entry width 384 (e.g., measured in a manner similar to slot widths 362 of plant pod 320.

According to exemplary embodiments, the slot widths 384 of the slots 382 defined in seal cap 380 may be greater than each of the locking tab widths 360 of locking tabs 330 of grow module 300. Further, locking tab width 360 of second locking tab 334 may be greater than locking tab widths 360 of first locking tab 332 and second locking tab 336, but less than each of slot entry widths 384 of slots 382 in seal cap 380, such that seal cap 380 may be slidably engageable with aperture 310 in any orientation. That is, any of locking tabs 330 of grow module 300 may be received by any of slots 382 of seal cap 380. The embodiment incorporating the seal cap 380 illustrated in FIG. 13 may otherwise be the same or similar to other embodiments described herein. Indeed, features of the various embodiments described herein may be interchangeable among embodiments to form still other embodiments of the present subject matter.

In summary, the grow module and plant pod assembly described herein may include locking features which enable vertical or near vertical growing of tall plants and provide a firm base that may prevent damage during plant growth. Plant pods may be positioned in the apertures of the grow module in a desired orientation. In addition, seal caps may be provided in the apertures where plants do not wish to be grown (and may be rotated to any orientation). Locking tabs may hold the plant pod(s) and/or the seal cap(s) firmly in place and create a tight seal between the pod/seal caps and the grow module, such as in a twist lock configuration, to minimize air or water leakage around complementary tapered interfaces. These connections may provide a strong interface for growing larger plants at any orientation while providing a tight seal as needed between the grow chambers and root chamber. In addition, plant pod(s) and seal cap(s) may be designed such that their installation and removal from the grow module is simple (e.g., requiring little time and no tools).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance, comprising:
 a liner positioned within a cabinet and defining a grow chamber;
 a grow module mounted within the liner, the grow module defining an aperture generally defining an axial direction, a radial direction, and a circumferential direction, wherein a first tapered interface surrounds the aperture and defines a locking tab that extends inward along the radial direction;
 a plant pod configured to slidably engage the aperture of the grow module, the plant pod defining a second tapered interface that is complementary to the first tapered interface and a slot that is defined within the second tapered interface for engaging the locking tab as the plant pod is rotated to an installed position; and
 a seal cap configured to slidably engage the aperture of the grow module, the seal cap defining a second tapered interface that is complementary to the first tapered interface and a slot that is defined within the second tapered interface for engaging the locking tab of the grow module as the seal cap is rotated to an installed position.

2. The gardening appliance of claim 1, wherein the locking tab and the slot are helical about the axial direction such that rotating the plant pod toward the installed position urges the second tapered surface into the first tapered surface.

3. The gardening appliance of claim 1, wherein the locking tab and the slot are oriented at an angle of between 20 degrees and 40 degrees relative to the circumferential direction.

4. The gardening appliance of claim 1, wherein the locking tab is a first locking tab and the first tapered interface further comprises a second locking tab, wherein each of the first locking tab and the second locking tab defines a tab width, wherein the slot is a first slot and the second tapered interface further defines a second slot, wherein each of the first slot and the second slot defines a slot entry width.

5. The gardening appliance of claim 4, wherein the tab width of the second locking tab is greater than the tab width of the first locking tab, and wherein the slot entry width of the second slot is greater than the slot entry width of the first slot.

6. The gardening appliance of claim 5, wherein the first tapered interface further comprises a third locking tab and the second tapered interface further defines a third slot, wherein a tab width of the third locking tab is the same as the tab width of the first locking tab and a slot entry width of the third slot is the same as the slot entry width of the first slot.

7. The gardening appliance of claim 4, wherein the tab width of the second locking tab is greater than the slot entry width of the first slot and less than the slot entry width of the second slot.

8. The gardening appliance of claim 4, wherein the tab width of the first locking tab is less than the slot entry width of the first slot and the slot entry width of the second slot.

9. The gardening appliance of claim 4, wherein the first locking tab and the second locking tab are evenly spaced about the circumferential direction on the first tapered interface.

10. The gardening appliance of claim 1, wherein the grow module at least partially defines a root chamber, and wherein the aperture is tapered toward the root chamber such that a diameter of the aperture is smaller proximate the root chamber.

11. The gardening appliance of claim 1, wherein the plant pod further comprises a handle that extends from the second tapered interface.

12. The gardening appliance of claim 11, wherein the handle is defined 180 degrees from a second locking tab along the circumferential direction.

13. The gardening appliance of claim 1, wherein the first tapered interface defines a plurality of locking tabs, each of the plurality of locking tabs defining a tab width, and wherein the seal cap defines a plurality of slots, each of the plurality of slots defining a slot entry width, wherein the slot entry width of each of the plurality of slots is greater than the tab width of each of the plurality of locking tabs.

14. The gardening appliance of claim 1, wherein the grow module defines a plurality of apertures including the aperture, wherein each of the plurality of apertures is configured for receiving either the plant pod or a seal cap.

15. A grow module for a gardening appliance, the grow module defining an aperture generally defining an axial direction, a radial direction, and a circumferential direction, wherein a first tapered interface surrounds the aperture and defines a locking tab that extends inward along the radial direction, wherein the aperture is configured to receive a plant pod that defines a second tapered interface complementary to the first tapered interface and a slot for receiving the locking tab to secure the plant pod and create a seal between the first tapered interface and the second tapered interface, the grow module further comprising a seal cap configured to slidably engage the aperture of the grow module, the seal cap defining a second tapered interface that is complementary to the first tapered interface and a slot that is defined within the second tapered interface for engaging the locking tab of the grow module as the seal cap is rotated to an installed position.

16. The grow module of claim 15, wherein the locking tab and the slot are helical about the axial direction such that rotating the plant pod toward an installed position urges the second tapered surface into the first tapered surface.

17. The grow module of claim 15, wherein the locking tab is a first locking tab and the first tapered interface further comprises a second locking tab, wherein each of the first locking tab and the second locking tab defines a tab width, wherein the slot is a first slot and the second tapered interface further defines a second slot, wherein each of the first slot and the second slot defines a slot entry width.

18. The grow module of claim 17, further wherein the tab width of the second locking tab is greater than the tab width of the first locking tab, and wherein the slot entry width of the second slot is greater than the slot entry width of the first slot.

19. A gardening appliance, comprising:
- a liner positioned within a cabinet and defining a grow chamber;
- a grow module mounted within the liner, the grow module defining an aperture generally defining an axial direction, a radial direction, and a circumferential direction, wherein a first tapered interface surrounds the aperture and defines a locking tab that extends inward along the radial direction; and
- a plant pod configured to slidably engage the aperture of the grow module, the plant pod defining a second tapered interface that is complementary to the first tapered interface and a slot that is defined within the second tapered interface for engaging the locking tab as the plant pod is rotated to an installed position, wherein the locking tab is a first locking tab and the first tapered interface further comprises a second locking tab, wherein each of the first locking tab and the second locking tab defines a tab width, wherein the slot is a first slot and the second tapered interface further defines a second slot, wherein each of the first slot and the second slot defines a slot entry width and wherein the tab width of the second locking tab is greater than the tab width of the first locking tab, less than the slot entry width of the second slot, and greater than the slot entry width of the first slot.

20. The gardening appliance of claim 19, wherein the locking tab and the slot are helical about the axial direction such that rotating the plant pod toward the installed position urges the second tapered surface into the first tapered surface.

* * * * *